United States Patent
Röckrath et al.

(10) Patent No.: US 6,835,420 B1
(45) Date of Patent: Dec. 28, 2004

(54) COATING MATERIAL AND ITS USE FOR PRODUCING HIGHLY SCRATCH RESISTANT MULTILAYER TRANSPARENT LACQUERS

(75) Inventors: Ulrike Röckrath, Senden (DE); Hubert Baumgart, Münster (DE); Andrea Zumbrink, Reken (DE); Stefan Silber, Krefeld (DE); Thomas Farwick, Billerbeck (DE)

(73) Assignee: BASF Coatings AC, Munster (DE)

( * ) Notice: Subject to any disclaimer, the term of this patent is extended or adjusted under 35 U.S.C. 154(b) by 274 days.

(21) Appl. No.: 10/049,606

(22) PCT Filed: Aug. 16, 2000

(86) PCT No.: PCT/EP00/07990
§ 371 (c)(1),
(2), (4) Date: Feb. 14, 2002

(87) PCT Pub. No.: WO01/12736
PCT Pub. Date: Feb. 22, 2001

(30) Foreign Application Priority Data

Aug. 16, 1999 (DE) .......................................... 199 38 759

(51) Int. Cl.$^7$ .............................. B05D 1/36; B05D 7/00; C08J 3/28; C08J 7/04

(52) U.S. Cl. ...................... 427/407.1; 427/515; 522/99; 522/148; 526/279

(58) Field of Search ......................... 522/99, 148, 172; 427/503, 515, 407.1; 428/447; 526/279

(56) References Cited

U.S. PATENT DOCUMENTS

| | | | |
|---|---|---|---|
| 3,547,848 A | 12/1970 | Marsh et al. | 260/22 |
| 3,639,147 A | 2/1972 | Benefiel et al. | 117/73 |
| 3,953,644 A | 4/1976 | Camelon et al. | 428/220 |
| 4,220,679 A | 9/1980 | Backhouse | 427/401 |
| 4,246,382 A | 1/1981 | Honda et al. | 526/279 |
| 4,268,542 A | 5/1981 | Sakakibara et al. | 427/195 |
| 4,311,622 A | 1/1982 | Buter | 260/18 |
| 4,383,068 A | 5/1983 | Brandt | 524/196 |
| 4,489,135 A | 12/1984 | Drexler et al. | 428/423.1 |
| 4,576,868 A | 3/1986 | Poth et al. | 428/423.1 |
| 4,605,712 A * | 8/1986 | Mueller et al. | 525/474 |
| 4,629,287 A | 12/1986 | Bishop | 350/96.34 |
| 4,673,718 A * | 6/1987 | Ryntz et al. | 525/476 |
| 4,675,234 A | 6/1987 | Sachs et al. | 428/328 |
| 4,677,028 A | 6/1987 | Heeringa et al. | 428/422.8 |
| 4,684,538 A * | 8/1987 | Klemarczyk | 427/515 |
| 4,710,542 A | 12/1987 | Forgione et al. | 525/127 |
| 4,719,132 A | 1/1988 | Porter, Jr. | 427/409 |
| 4,730,020 A | 3/1988 | Wilfinger et al. | 524/555 |
| 4,746,366 A | 5/1988 | Philipp et al. | 106/287 |
| 4,754,014 A | 6/1988 | Ryntz et al. | 528/28 |
| 4,766,185 A | 8/1988 | Ryntz et al. | 525/479 |
| 4,837,289 A * | 6/1989 | Mueller et al. | 526/279 |
| 4,851,460 A | 7/1989 | Stranghöner et al. | 523/407 |
| 4,873,298 A | 10/1989 | Ryntz | 525/479 |
| 4,880,867 A | 11/1989 | Gobel et al. | 524/507 |
| 4,895,910 A | 1/1990 | Isozaki et al. | 525/326.5 |
| 4,914,148 A | 4/1990 | Hille et al. | 524/507 |
| 4,939,213 A | 7/1990 | Jacobs, III et al. | 525/329.9 |
| 4,945,128 A | 7/1990 | Hille et al. | 524/591 |
| 4,981,759 A | 1/1991 | Nakatani et al. | 428/626 |
| 5,075,372 A | 12/1991 | Hille et al. | 524/839 |
| 5,079,312 A | 1/1992 | Isozaki et al. | 525/479 |
| 5,084,541 A | 1/1992 | Jacobs, III et al. | 528/45 |
| 5,236,995 A | 8/1993 | Salatin et al. | 524/591 |
| 5,330,796 A * | 7/1994 | Kasari et al. | 427/407.1 |

(List continued on next page.)

FOREIGN PATENT DOCUMENTS

| | | | |
|---|---|---|---|
| CA | 2 073 115 | 7/1992 | C08L/75/14 |
| CA | 2102169 | 5/1994 | C09D/175/14 |

(List continued on next page.)

OTHER PUBLICATIONS

English Abstract for DE3828098 from EPO, Mar. 14, 1990.
English Abstract for DE3903804 from EPO, Aug. 23, 1990.
English Abstract for DE4011045 from EPO, Oct. 9, 1991.
English Abstract for DE4020316 from EPO, Jan. 9, 1992.
English Abstract for DE4025215 from EPO, Feb. 19, 1992.
English Abstract for DE4122743 from EPO, Jan. 27, 1993.
English Abstract for DE4303570 from EPO, Aug. 17, 1994.
English Abstract for DE4328092 from EPO, Feb. 23, 1995.
English Abstract for EP0069936 from EPO, Jan. 19, 1983.
English Abstract for EP0297576 from EPO, Jan. 4, 1989.
English Abstract Cover Page of the International Publication WO00/50178, Ser. No. 09/890,760.
English Abstract Cover Page of the International Publication WO00/26309, Ser. No. 09/807,711.
English Abstract Cover Page of the International Publication WO96/38490.
English Abstract Cover Page of the International Publication WO95/14721.
English Abstract Cover Page of the International Publication WO94/22968.

*Primary Examiner*—Susan Berman

(57) ABSTRACT

The invention relates to a coating material which can be hardened thermally and, optionally, by using actinic radiation. Said coating material contains: A) a binding agent comprising at least two functional groups (a1) which can enter into thermal cross-linking reactions with complementary functional groups (b1) in cross-linking agent (B), and; (B) at least one cross-linking agent comprising at least two functional groups (b1) which can enter into thermal cross-linking reactions with complementary functional groups (a1) in binding agent (A). At least one binding agent (A) contains, in an integrally polymerized manner, at least one olefinically unsaturated polysiloxane macromonomer which contains, in the statistical mean, at least 3.0 double bonds per molecule. The invention also relates to the use of the coating material for producing highly scratch resistant multilayer transparent lacquers.

20 Claims, No Drawings

U.S. PATENT DOCUMENTS

| | | | |
|---|---|---|---|
| 5,334,420 A | 8/1994 | Hartung et al. .......... 427/407.1 |
| 5,342,882 A | 8/1994 | Göbel et al. ................ 524/832 |
| 5,356,669 A | 10/1994 | Rehfuss et al. .......... 427/407.1 |
| 5,368,944 A | 11/1994 | Hartung et al. .......... 428/423.1 |
| 5,370,910 A | 12/1994 | Hille et al. .............. 427/407.1 |
| 5,416,136 A | 5/1995 | Konzmann et al. ......... 523/414 |
| 5,418,264 A | 5/1995 | Obloh et al. ................ 523/414 |
| 5,425,970 A | 6/1995 | Lahrmann et al. .......... 427/493 |
| 5,474,811 A | 12/1995 | Rehfuss et al. .......... 427/407.1 |
| 5,486,384 A | 1/1996 | Bashan et al. .............. 427/493 |
| 5,512,322 A | 4/1996 | Hille et al. .............. 427/407.1 |
| 5,552,496 A | 9/1996 | Vogt-Birnbrich et al. ... 525/440 |
| 5,569,705 A | 10/1996 | Vogt-Birnbrich et al. ... 524/591 |
| 5,571,861 A | 11/1996 | Klein et al. ................ 524/591 |
| 5,576,386 A | 11/1996 | Kempter et al. ............. 526/88 |
| 5,601,878 A | 2/1997 | Kranig et al. ................ 427/386 |
| 5,601,880 A | 2/1997 | Schwarte et al. ........ 427/407.1 |
| 5,605,965 A | 2/1997 | Rehfuss et al. ............ 525/100 |
| 5,623,016 A | 4/1997 | Klein et al. ................ 524/591 |
| 5,635,564 A | 6/1997 | Wieditz et al. ............. 525/194 |
| 5,654,391 A | 8/1997 | Göbel et al. ................. 528/71 |
| 5,658,617 A | 8/1997 | Gobel et al. ............. 427/372.2 |
| 5,672,649 A | 9/1997 | Brock et al. ................ 524/507 |
| 5,686,531 A * | 11/1997 | Engelke et al. ............. 525/111 |
| 5,691,419 A * | 11/1997 | Engelke et al. ............. 525/208 |
| 5,691,425 A | 11/1997 | Klein et al. ................ 525/455 |
| 5,703,156 A | 12/1997 | Sauer ........................ 524/802 |
| 5,726,258 A | 3/1998 | Fscher et al. ................ 526/64 |
| 5,760,128 A | 6/1998 | Baltus et al. ............... 524/591 |
| 5,965,213 A | 10/1999 | Sacharski et al. ........... 427/475 |
| 6,001,915 A | 12/1999 | Schwarte et al. ........... 524/457 |
| 6,001,947 A | 12/1999 | Brünnemann et al. ....... 528/28 |
| 6,113,988 A * | 9/2000 | Borgholte et al. ....... 427/407.1 |
| 6,130,019 A * | 10/2000 | Nishikawa et al. ..... 430/111.35 |
| 6,159,556 A | 12/2000 | Möller et al. ............... 427/475 |
| 6,309,707 B1 | 10/2001 | Mayer et al. ................ 427/386 |
| 6,329,020 B1 | 12/2001 | Patzschke et al. .......... 429/407 |
| 6,344,501 B1 | 2/2002 | Sierakowski et al. ....... 523/410 |
| 6,372,875 B1 | 4/2002 | Mayer et al. ................. 528/60 |
| 6,534,185 B1 * | 3/2003 | Baumgart et al. .......... 428/447 |

FOREIGN PATENT DOCUMENTS

| | | | |
|---|---|---|---|
| CA | 2079498 | 8/2001 | ............ B05D/3/06 |
| CA | 2102170 | 8/2001 | ......... C09D/133/00 |
| EP | 0 038 127 A1 | 3/1981 | ............ B05D/7/26 |
| EP | 0 192 304 B1 | 2/1986 | ............ C09D/5/04 |
| EP | 0 250 631 A1 | 7/1986 | ............ C03C/25/02 |
| EP | 0 284 679 A1 | 4/1987 | ............ C09D/3/82 |
| EP | 0 249 201 A2 | 6/1987 | ............ C09D/3/58 |
| EP | 0 276 501 A2 | 9/1987 | ............ C11D/1/42 |
| EP | 0 320 552 A1 | 12/1987 | ............ B05D/7/16 |
| EP | 0 299 148 A2 | 4/1988 | ............ C08G/18/08 |
| EP | 0 354 261 A1 | 8/1988 | ............ C08G/18/50 |
| EP | 0 358 153 B1 | 9/1989 | ......... C09D/143/04 |
| EP | 0 394 737 A1 | 4/1990 | ......... C09D/175/06 |
| EP | 0 401 565 A1 | 5/1990 | ............ C09D/5/02 |
| EP | 0 424 705 A2 | 10/1990 | ......... C08F/283/00 |
| EP | 0 471 972 A2 | 7/1991 | ............ C09D/5/38 |
| EP | 0 531 510 B1 | 3/1992 | ............ C08L/75/04 |
| EP | 0 590 484 A1 | 9/1993 | ............ C08G/18/08 |
| EP | 0 594 068 A1 | 10/1993 | ......... C09D/201/02 |
| EP | 0 594 071 A1 | 10/1993 | ......... C09D/201/02 |
| EP | 0 594 142 A1 | 10/1993 | ............ C08L/57/12 |
| EP | 0 604 922 A1 | 12/1993 | ............ C08K/5/3492 |
| EP | 0 624 577 A1 | 5/1994 | ............ C07D/251/70 |
| EP | WO95/27742 | 10/1995 | ............ C08F/18/04 |
| EP | 0 844 286 A1 | 12/1997 | ............ C09D/5/03 |
| GB | 2012191 A | 12/1978 | ............ B05D/1/36 |
| WO | WO82/02387 | 7/1982 | ............ C08F/2/02 |
| WO | WO90/06186 | 6/1990 | ............ B05D/7/26 |
| WO | WO92/22615 | 12/1992 | ............ C09D/151/08 |
| WO | WO93/17060 | 9/1993 | ............ C08G/63/02 |
| WO | WO94/10211 | 5/1994 | ............ C08F/8/30 |
| WO | WO94/10212 | 5/1994 | ............ C08F/8/30 |
| WO | WO94/10213 | 5/1994 | ............ C08F/8/30 |
| WO | WO94/22969 | 10/1994 | ......... C09D/133/06 |
| WO | WO96/12747 | 2/1996 | ......... C08F/285/00 |
| WO | WO96/12754 | 5/1996 | ............ C08G/63/20 |
| WO | WO97/12945 | 4/1997 | ............ C09D/5/04 |
| WO | WO97/49745 | 12/1997 | ............ C08G/18/08 |
| WO | WO97/49747 | 12/1997 | ............ C09D/18/75 |
| WO | WO 00/26309 | 5/2000 | ......... C09D/143/04 |

* cited by examiner

COATING MATERIAL AND ITS USE FOR PRODUCING HIGHLY SCRATCH RESISTANT MULTILAYER TRANSPARENT LACQUERS

This application is a National Phase Application of Patent Application PCT/EP00/07990 filed on Aug. 16, 2000.

The present invention relates to a novel coating material curable thermally and, if desired, with actinic radiation and also to a novel highly scratch-resistant multicoat clearcoat system produced using it. The present invention also relates to the use of the novel highly scratch-resistant multicoat clearcoat system in automotive OEM finishing and automotive refinish, in industrial coating, including coil coating and container coating, in the coating of plastics, and in furniture coating. The present invention further relates to a novel process for producing multicoat clearcoat systems and multicoat color and/or effect paint systems.

Automobile bodies, plastics parts for automobiles or domestic appliances, and industrial components are nowadays protected by a clearcoat. This clearcoat may be used as the sole coating film or may form the topmost coat of a multicoat color and/or effect paint system. Automobile bodies in particular are very extensively provided with a multicoat color and/or effect paint system of this kind.

The requirements imposed on the resistance of coating systems which are exposed to weathering, especially insolation and acid rain, and also, even more frequently, to mechanical stress, especially that produced by wash-brush cleaning installations, are becoming increasingly stringent. This is so most particularly for vehicle finishes, which have to meet these requirements while also satisfying very high optical demands regarding gloss, surface smoothness, and color.

To date this problem has been solved by applying to the substrates a multicoat paint system which, in accordance with the heightened environmental compatibility requirements, is constructed in particular from aqueous coating materials. In the case of metal substrates, this system is produced, conventionally, from an aqueous electrocoat material, a water-based surfacer, a basecoat material, in particular an aqueous basecoat material, and a solventborne clearcoat material. The electrocoat material and the water-based surfacer are each baked following their application, and then form the primer system. The basecoat material, particularly the aqueous basecoat material, is applied to this system and dried. Over this film, which is not yet fully cured, the clearcoat material is applied, after which the two films are cured together (wet-on-wet technique). Where the substrates used comprise plastics, water-based primers are conventionally employed in place of the electrocoat materials.

The wet-on-wet technique for producing multicoat color and/or effect paint systems is described, for example, in the patents U.S. Pat. No. 3,639,147, DE-A-3 333 072, DE-A-38 14 853, GB-A-2 012 191, U.S. Pat. No. 3,953,644, EP-A-0 260 447, DE-A-39 03 804, EP-A-0 320 552, DE-A-36 28 124, U.S. Pat. No. 4,719,132, EP-A-0 297 576, EP-A-0 069 936, EP-A-0 089 497, EP-A-0 195 931, EP-A-0 228 003, EP-A-0 038 127, and DE-A-28 18 100.

The optical or visual appearance and the weathering stability are primarily the responsibility of the two topmost coats of the multicoat paint system. Thus it is the basecoat, especially aqueous basecoat, which gives the multicoat paint system its color and/or optical effects such as metallic effects or interference effects, while the clearcoat provides not only scratch resistance and etch resistance, i.e., resistance to damaging environmental substances, but also the appearance qualities, i.e., the gloss, brilliance, and evenness. In this system, aqueous basecoat material and clearcoat material must be very precisely matched to one another in order to produce a system having the desired advantageous profile of properties.

Aqueous basecoat materials and the corresponding paint systems which substantially meet these requirements are known from the patents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28 092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747 or EP-A-0 401 565.

For producing a single-coat or multicoat clearcoat system, use is nowadays made of the customary and known one-component (1K), two-component (2K), multicomponent (3K, 4K) power or powder slurry clearcoat materials or UV-curable clearcoat materials.

One-component (1K), two-component (2K) or multi-component (3K, 4K) clearcoat materials are described, for example, in the patents U.S. Pat. Nos. 5,474,811, 5,356,669, 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

Powder clearcoat materials are known, for example, from the German patent DE-A-42 22 194 or the BASF Lacke+Farben AG product information leaflet "Pulverlacke" [powder coating materials], 1990.

Powder slurry coating materials comprise powder coatings in the form of aqueous dispersions. Slurries of this kind are described, for example, in the US patent U.S. Pat. No. 4,268,542 and the German patent applications DE-A-195 18 392.4 and DE-A-196 13 547, and in the German patent application DE-A-198 14 471.7, which was unpublished at the priority date of the present specification.

UV-curable clearcoat materials are disclosed, for example, in the patents EP-A-0 540 884, EP-A-0 568 967 or U.S. Pat. No. 4,675,234.

Each of these clearcoat materials has specific strengths and weaknesses. Accordingly, these clearcoat materials produce multicoat systems which satisfy the optical requirements. However, the scratch-resistant one-component (1K) clearcoats are sometimes not sufficiently stable to weathering, whereas the weathering-stable two-component (2K) or multicomponent (3K, 4K) clearcoats are often not sufficiently scratch-resistant. Some one-component (1K) clearcoats, although scratch-resistant and stable to weathering, exhibit surface defects such as shrinkage (wrinkling) in combination with frequently employed aqueous basecoats.

Powder clearcoats, powder slurry clearcoats, and UV-curable clearcoats, on the other hand, have a not entirely satisfactory intercoat adhesion, without fully solving the problems of scratch resistance or of etch resistance.

EP-A-0 568 967 discloses a process for producing multicoat paint systems, wherein a thermally curable clearcoat film is applied by the wet-on-wet technique to a pigmented basecoat film and then the two films are heat-cured together. Atop the cured clearcoat there is then applied at least one further clearcoat film based on coating materials curable with actinic radiation, which is cured with actinic radiation or thermally and with actinic radiation. This process provides clearcoats with high chemical resistance and optical quality. The scratch resistance, however, is unsatisfactory.

EP-A-0 568 967 further discloses a process wherein a coating material curable with actinic radiation is applied to the pigmented basecoat film and cured. Then a further film of the same coating material is applied and is cured using actinic radiation. Although the result is a highly glossy surface without perceptible texture, this clearcoat yellows. Also, the scratch resistance continues to leave something to be desired.

More recently, materials known as sol-gel clearcoats and based on siloxane-containing coating formulations have been developed which are obtained by hydrolysis and condensation of silane compounds. These materials, which are used as coating compositions on plastics, are described, for example, in the German patents DE-A-43 03 570, DE-A-34 07 087, DE-A-40 11 045, DE-A-40 25 215, DE-A-38 28 098, DE-A-40 20 316 or DE-A-41 22 743.

Sol-gel clearcoats impart very good scratch resistance to substrates made of plastic, such as spectacle lenses or motorcycle helmet visors, for example. This scratch resistance is not achieved by the above-described, known OEM (original equipment manufacturing) clearcoat materials normally used for the original finishing of vehicles. The automobile industry is now demanding that this improved scratch resistance be transferred to the clearcoats used in the finishing of automobiles, as well. Better protection is intended in particular for those parts of the automobile bodies that are particularly highly stressed, such as hood, bumpers, sills or doors in the door-handle region.

Replacing the OEM clearcoat materials or OEM powder slurry clearcoat materials commonly used in automotive finishing by sol-gel clearcoat materials, however, is not immediately possible, since the clearcoats are too brittle for this purpose, for example, or because the optical properties (appearance) achieved during the attempt to adapt them to the OEM requirements are frequently poor. Furthermore, they cannot be applied at thicknesses >8 to 10 $\mu$m. Moreover, constituents of the sol-gel clearcoat materials may "strike through" during their drying and/or curing; that is, they are absorbed by the substrate, and, as a result, the clearcoats in question lose hardness. Above all, however, the sol-gel clearcoat materials are too expensive.

The economically more favorable use of the sol-gel clearcoat materials as an additional coat over the clearcoats used to date gives rise to adhesion problems within the multicoat clearcoat system, between the clearcoat and the sol-gel coat, these problems arising in particular after stonechipping and on exposure to condensation. In some cases, these problems are exacerbated by virtue of the fact that adhesion between the clearcoat and the substrate is also affected.

These problems may be solved to a certain degree by subjecting the clearcoat film that is to be coated with the sol-gel clearcoat material to only partial curing, so that on conjoint curing the sol-gel coating can be anchored chemically, so to speak, on the clearcoat film. However, the second clearcoat film requires a long oven drying time to cure, which is a considerable disadvantage.

It is an object of the present invention to provide a novel coating material, curable thermally and, if desired, with actinic radiation, which gives a novel multicoat clearcoat system which no longer has the disadvantages of the prior art but instead is easy to prepare, highly scratch-resistant, stable to weathering, free from yellowing, hard, flexible, and free from surface defects, exhibits excellent adhesion to all substrates and within the clearcoat system too, and can be produced at the high coat thickness required for an outstanding overall visual appearance. It is a further object of the present invention to provide a novel process for producing such multicoat clearcoats from at least one novel coating material.

The invention accordingly provides the novel coating material, curable thermally and, if desired, with actinic radiation, which comprises A) at least one binder containing at least two functional groups (a1) which are able to undergo thermal crosslinking reactions with complementary functional groups (b1) in the crosslinking agent (B), and B) at least one crosslinking agent containing at least two functional groups (b1) which are able to undergo thermal crosslinking reactions with the complementary functional groups (a1) in the binder (A), and also, if desired, C) at least one constituent which is crosslinkable with actinic radiation, D) at least one photoinitiator, E) at least one thermal crosslinking initiator, F) at least one reactive diluent curable with actinic radiation and/or thermally, G) at least one coatings additive, and/or H) at least one organic solvent, in which at least one binder (A) contains in copolymerized form at least one olefinically unsaturated polysiloxane macromonomer containing on average per molecule at least 3.0 double bonds.

In the text below, the novel coating material curable thermally and, if desired, with actinic radiation is referred to as "coating material of the invention".

The invention further provides the novel highly scratch-resistant multicoat clearcoat system KL for a primed or unprimed substrate, which is producible by (1) applying at least one clearcoat film I of a coating material I curable thermally and, if desired, with actinic radiation to the surface of the substrate and
(1.1) partly or
(1.2) fully
curing it, and (2) applying a further clearcoat film II of a coating material II curable thermally and, if desired, with actinic radiation to the surface of the clearcoat film(s) I (3) and then curing
(3.1) the clearcoat films I and II together or
(3.2) the clearcoat film II alone,
thermally and, if desired, with actinic radiation, wherein the coating material II and/or the coating material I, especially the coating material II, is a coating material of the invention.

The novel highly scratch-resistant multicoat clearcoat system KL is referred to below as the "clearcoat system KL of the invention".

The invention further provides the novel process for producing a highly scratch-resistant multicoat clearcoat system KL on a primed or unprimed substrate by (1) applying at least one clearcoat film I of a coating material I curable thermally and, if desired, with actinic radiation to the surface of the substrate and
(1.1) partly or
(1.2) fully
curing it, and (2) applying a further clearcoat film II of a coating material II curable thermally and, if desired, with actinic radiation to the surface of the clearcoat film(s) I (3) and then curing
  (3.1) the clearcoat films I and II together or
  (3.2) the clearcoat film II alone,
  thermally and, if desired, with actinic radiation,
wherein the coating material II and/or the coating material I, especially the coating material II, is a coating material of the invention.

In the text below, the novel process for producing highly scratch-resistant clearcoat systems KL is referred to as "KL process of the invention".

The invention additionally provides the novel highly scratch-resistant multicoat color and/or effect paint system ML for a primed or unprimed substrate, which is producible by (1) applying at least one color and/or effect basecoat film III of a pigmented coating material III curable thermally and, if desired, with actinic radiation to the surface of the substrate, and drying it without curing, (2) applying at least one clearcoat film I of a coating material I curable thermally and, if desired, with actinic radiation to the surface of the basecoat film III, and
  (2.1) partly curing it alone,
  (2.2) partly curing it together with the basecoat film III, or
  (2.3) fully curing it together with the basecoat film III, thermally and, if desired, with actinic radiation, and (3) applying a further clearcoat film II of a coating material II curable thermally and, if desired, with actinic radiation to the surface of the clearcoat film(s) I, (4) and then curing
  (4.1) the clearcoat films I and II and the basecoat film III together or
  (4.2) the clearcoat film II alone, thermally and, if desired, with actinic radiation,
in which the coating material II and/or the coating material I, especially the coating material II, is a coating material of the invention.

In the text below, the novel multicoat color and/or effect paint system ML is referred to as "multicoat paint system ML of the invention".

The invention additionally provides the novel process for producing a highly scratch-resistant multicoat color and/or effect paint system ML on a primed or unprimed substrate by (1) applying at least one color and/or effect basecoat film III of a pigmented coating material III curable thermally and, if desired, with actinic radiation to the surface of the substrate, and drying it without curing, (2) applying at least one clearcoat film I of a coating material I curable thermally and, if desired, with actinic radiation to the surface of the basecoat film III, and
  (2.1) partly curing it alone,
  (2.2) partly curing it together with the basecoat film III, or
  (2.3) fully curing it together with the basecoat film III, thermally and, if desired, with actinic radiation, and (3) applying a further clearcoat film II of a coating material II curable thermally and, if desired, with actinic radiation to the surface of the clearcoat film(s) I, (4) and then curing
  (4.1) the clearcoat films I and II and the basecoat film III together or
  (4.2) the clearcoat film II alone,
  thermally and, if desired, with actinic radiation,
in which the coating material II and/or the coating material I, especially the coating material II, is a coating material of the invention.

In the text below, the novel process for producing a highly scratch-resistant multicoat color and/or effect paint system ML is referred to as the "ML process of the invention".

The invention relates not least to primed or unprimed substrates coated with at least one clearcoat system KL of the invention and/or with at least one multicoat paint system ML of the invention.

In the context of the present invention, the term "thermal curing" denotes the heat-initiated curing of a film of a coating material for which normally a separate crosslinking agent is employed. It is commonly referred to by those in the art as external crosslinking. Where the crosslinking agents are already incorporated in the binders, the term "self-crosslinking" is used. In accordance with the invention, external crosslinking is of advantage and is therefore employed with preference.

In the context of the present invention, actinic radiation means electron beams or, preferably, UV radiation. Curing by UV radiation is normally initiated by radical or cationic photoinitiators and in terms of its mechanism is a radical or cationic photopolymerization.

Where thermal curing and curing with actinic light are employed together for a coating material, the term "dual cure" is used In the light of the prior art it was surprising and unforeseeable for the skilled worker that the complex object on which the invention is based could be achieved by means of the coating material of the invention, the clearcoat system KL of the invention, and the multicoat paint system ML of the invention, and also the KL and ML processes of the invention. A particular surprise is that not only the intercoat adhesion within the clearcoat system KL of the invention but also the adhesion to the basecoat III within the multicoat paint system ML of the invention are improved to an extent far beyond that known. The clearcoat system KL of the invention and the multicoat paint system ML of the invention have outstanding optical properties, particularly a high level of fullness, high DOI values, high gloss, and no yellowing. In combination with these properties, the clearcoat system KL of the invention and the multicoat paint system ML of the invention are of outstanding weathering stability and chemical stability. Not least, however, they are extraordinarily scratch-resistant.

The coating material of the invention comprises as essential constituent at least one binder (A) containing in copolymerized form at least one olefinically unsaturated polysiloxane macromonomer which has on average per molecule at least 3.0 double bonds.

In accordance with the invention it is of advantage if the polysiloxane macromonomer has on average per molecule at least 4.0, with particular preference 5.0, and in particular 5.5 double bonds. In order to obtain the advantages according to the invention, it is sufficient in the great majority of cases for there to be on average per molecule 10.5, preferably 9.0, with particular preference 8.5, and in particular 8.0 double bonds. Particular advantages are obtained if the polysiloxane macromonomer contains on average per molecule from 5.5 to 6.5, in particular 6.0, double bonds.

Particular suitability in accordance with the invention is possessed by polysiloxane macromonomers which have a number-average molecular weight $M_n$ of from 500 to 100000, preferably from 1000 to 50000, with particular preference from 2000 to 30000, and in particular from 2500 to 20000 daltons.

Especially suitable polysiloxane macromonomers are those which are in three-dimensionally crosslinked form.

Very particularly suitable polysiloxane macromonomers are those of the type described above wherein the polysiloxane macromonomers are alkyl-, cycloalkyl-, alkyl-aryl-, alkyl-cycloalkyl-, cycloalkyl-aryl- or arylsiloxane resins. Advantageously, the alkyl radicals contain from 1 to 10, with particular preference from 1 to 5, and in particular from 1 to 3 carbon atoms, the cycloalkyl radicals contain from 3 to 10, with particular preference from 4 to 8, and in particular from 5 to 7 carbon atoms, and the aryl radicals contain from 6 to 12 and, in particular, from 6 to 10 carbon atoms.

Of these radicals, the alkyl radicals are of particular advantage and are therefore used with particular preference. In terms of the preparation of the polysiloxane macromonomers and their technical effects in the binders (A) and in the coating materials of the invention, methyl radicals prove especially advantageous. They are therefore used with very particular preference.

The olefinically unsaturated double bonds of the polysiloxane macromonomers for inventive use are present in acrylic, methacrylic, ethacrylic, vinyl, allyl and/or crotonyl groups. Of these, the acrylic, methacrylic, and vinyl groups, but especially the acrylic groups, afford particular advantages and are therefore used with very particular preference.

The above-described polysiloxane macromonomers for inventive use are prepared by the conventional methods of polysiloxane chemistry. The polysiloxane macromonomers for inventive use are, moreover, available on the market and are sold, for example, by Tego Chemie Service GmbH under the trade name Tego® LA-S 517.

The binders (A) for inventive use may contain the polysiloxane macromonomers in copolymerized form in widely varying amounts. Owing to their high functionality of on average more than 3.0 double bonds per molecule, a fraction of up to 15% by weight, preferably up to 10% by weight, with particular preference up to 5% by weight, and in particular up to 2% by weight, based in each case on the binder (A), is sufficient in the great majority of cases to achieve the technical effects and advantages according to the invention. In this context it proves to be of very particular advantage, in accordance with the invention, that amounts of just at least 0.01% by weight, preferably at least 0.05% by weight, with particular preference at least 0.08% by weight, and in particular at least 0.1% by weight, based in each case on the binder (A), bring about the technical effects and advantages according to the invention.

The binders (A) for inventive use contain at least two, particularly at least three, functional groups (a1) which are able to undergo thermal crosslinking reactions with complementary functional groups (b1) in the crosslinking agent (B).

Examples of suitable complementary reactive functional groups (a1) and (b1) for use in accordance with the invention, which undergo crosslinking reactions, are assembled in the following overview. In the overview, the variable R stands for an acyclic or cyclic aliphatic radical, an aromatic radical and/or an aromatic-aliphatic (araliphatic) radical; the variables $R^1$ and $R^2$ stand for identical or different aliphatic radicals or are linked with one another to form an aliphatic or heteroaliphatic ring.

Overview: Examples of Complementary Functional Groups (a1) and (b2) in

Binder (A) and Crosslinking Agent (B) or
Crosslinking Agent (B) and Binder (A)

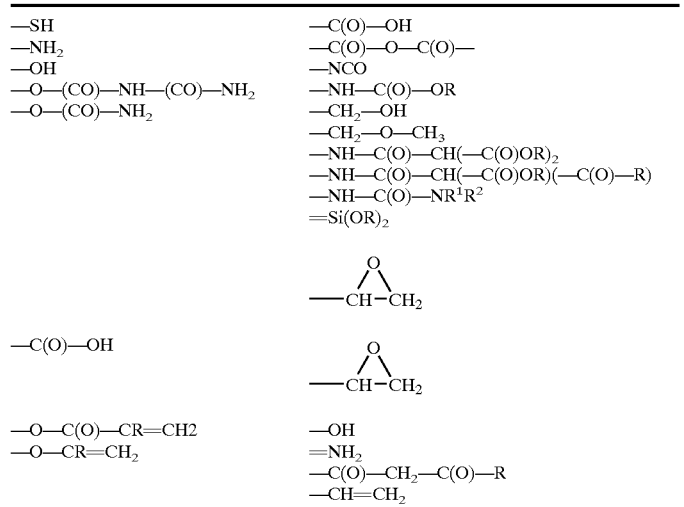

The selection of the respective complementary groups (a1) and (b2) is guided firstly by the consideration that on storage they must not undergo any unwanted reactions and/or, where appropriate, disrupt or inhibit the curing with actinic radiation, and secondly by the temperature range within which thermal curing is to take place.

With a view to thermally sensitive substrates such as plastics, in particular, it is of advantage in accordance with the invention here to choose a temperature range which does not exceed 100° C., particularly 80° C. In view of these boundary conditions, hydroxyl groups and isocyanate groups or carboxyl groups and epoxy groups have proven advantageous as complementary functional groups, and accordingly are employed with preference in accordance with the invention in the coating materials of the invention that are in the form of two-component or multicomponent systems. Particular advantages result if the hydroxyl groups are used as functional groups (a1) and the isocyanate groups as functional groups (b2).

Where higher crosslinking temperatures may be employed, for example, from 100° C. to 180° C., suitable coating materials of the invention also include one-component systems, in which the functional groups (a1) are preferably thio, amino, hydroxyl, carbamate, allophanate, carboxyl, and/or (meth)acrylate groups, but especially hydroxyl groups, and the functional groups (b1) are preferably anhydride, carboxyl, epoxy, blocked isocyanate, urethane, methylol, methylol ether, siloxane, amino, hydroxyl and/or beta-hydroxyalkylamide groups.

Accordingly, the binders (A) preferred in accordance with the invention are hydroxyl-containing oligomeric or polymeric resins.

Examples of suitable binders (A) particularly preferred in accordance with the invention are hydroxyl-containing linear and/or branched and/or block, comb and/or random poly(meth)acrylates or acrylate copolymers, polyesters, alkyds, amino resins, polyurethanes, acrylated polyurethanes, acrylated polyesters, polylactones, polycarbonates, polyethers, epoxy resin-amine adducts, (meth)acrylatediols, partially hydrolyzed polyvinyl esters or polyureas, of which the acrylate copolymers, the polyesters, the polyurethanes, the polyethers, and the epoxy resin-amine adducts, but especially the acrylate copolymers, are particularly advantageous and are therefore used with particular preference.

In the case of binders for aqueous coating materials, the binders include ionic or nonionic groups which ensure solubility in water or dispersibility in water.

Particularly preferred acrylate copolymers (A) are preparable by polymerizing (m1) from 10 to 70% by weight, preferably from 20 to 60% by weight, of a hydroxyl-containing ester of acrylic acid or methacrylic acid, or a mixture of such monomers, (m2) from 10 to 70% by weight, preferably from 20 to 60% by weight, of an aliphatic or cycloaliphatic ester of acrylic acid or methacrylic acid preferably having at least 4 carbon atoms in the alcohol residue, which is different than (m1), or of a mixture of such monomers, from 0.01 to 15% by weight, preferably from 0.05 to 10% by weight, of the polysiloxane macromonomer for inventive use, (m3) from 0 to 2% by weight, preferably from 0 to 1% by weight, of an ethylenically unsaturated carboxylic acid or of a mixture of ethylenically unsaturated carboxylic acids, and (m4) from 0 to 30% by weight, preferably from 0 to 20% by weight, of an ethylenically unsaturated monomer different than (m1), (m2), (m3), or of a mixture of such monomers, to give a polyacrylate resin having an acid number of from 0 to 15, preferably from 0 to 8, a hydroxyl number of from 80 to 140, preferably from 80 to 120, and a number-average molecular weight of from 1500 to 10000, preferably from 2000 to 5000, the sum of the weight fractions of components (m1), (m2), (m3), and (m4) always giving 100% by weight.

The acrylate copolymers (A) used with preference may be prepared by widely and well-known polymerization techniques in bulk, solution or emulsion. Polymerization techniques for preparing polyacrylate resins are widely known and have been much described (cf. e.g.: Houben Weyl, Methoden der organischen Chemie, 4th edition, volume 14/1, page 24 to 255 (1961)).

Further examples of suitable (co)polymerization techniques for preparing the acrylate copolymers (A) are described in the patents DE-A-197 09 465, DE-C-197 09 476, DE-A-28 48 906, DE-A-195 24 182, EP-A-0 554 783, WO 95/27742, DE-A-38 41 540 or WO 82/02387.

Taylor reactors are advantageous, particularly for copolymerization in bulk, solution or emulsion.

Taylor reactors, which serve to convert substances under the conditions of Taylor flow, are known. They consist substantially of two coaxial concentric cylinders of which the outer one is fixed while the inner one rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. Besides the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta=\omega_i r_i d v^{-1}(d/r_i)^{1/2} \qquad (I)$$

where $d=r_o-r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The viscosity force acts counter to the centrifugal force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer occurring between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of particular advantage in this context are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap widens in the direction of flow therethrough.

The acrylate copolymers (A) used are preferably prepared by means of the solution polymerization process. In this process, normally an organic solvent or solvent mixture is introduced as the initial charge and is heated to boiling. The monomer mixture to be polymerized, together with one or more polymerization initiators, are then added continuously to this organic solvent or solvent mixture. The polymerization takes place at temperatures between 100 and 160° C., preferably between 130 and 150° C. As copolymerization initiators it is preferred to use initiators which form free radicals. The strength and amount of initiator are customarily chosen in such a way that the supply of free radicals during the feed phase at the polymerization temperature is very largely constant.

Examples of initiators that may be used include the following: dialkyl peroxides, e.g., di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; azo dinitriles such as azobisisobutyronitrile or C-C-cleaving initiators such as benzpinacol silyl ethers.

The polymerization conditions (reaction temperature, feed time of the monomer mixture, nature and amount of organic solvents and polymerization initiators, possible use of molecular weight regulators, e.g., mercaptans, thioglycolic esters, and hydrogen chlorides) are selected so that the polyacrylate resins used have a number-average molecular weight of from 1 500 to 10000, preferably from 2000 to 5000 (as determined by gel permeation chromatography using polystyrene as calibrating substance).

The acid number of the acrylate copolymers (A) used in accordance with the invention may be adjusted by the skilled worker using appropriate amounts of the monomers (m3). Similar comments apply to the adjustment of the hydroxyl number. It can be controlled by the amount of monomer (m1) used.

As monomers (m1) it is possible in principle to use any hydroxyl-containing ester of acrylic acid or methacrylic acid, or a mixture of such monomers. Examples include the following: hydroxyalkyl esters of acrylic acid, such as hydroxyethyl acrylate, hydroxypropyl acrylate, hydroxybutyl acrylate, for example, especially 4-hydroxybutyl acrylate; hydroxyalkyl esters of methacrylic acid, such as hydroxyethyl methacrylate, hydroxypropyl methacrylate, hydroxybutyl methacrylate, for example, especially 4-hydroxybutyl methacrylate; and reaction products of cyclic esters, such as epsilon-caprolactone, for example, and hydroxyalkyl esters of acrylic acid and/or methacrylic acid.

The composition of the monomers (m1) is preferably selected such that polymerization of the monomers (m1) alone gives a polyacrylate resin having a glass transition temperature of from −50 to +70° C., preferably from −30 to +50° C. The glass transition temperature may be calculated approximately by the skilled worker with the aid of the formula $$1/T_G = \sum_{n=1}^{n=x} W_n/T_{Gn}$$

$T_G$=glass transition temperature of the polymer
X=number of different polymerized monomers
$W_n$=weight fraction of the nth monomer
$T_{Gn}$=glass transition temperature of the homopolymer of the nth monomer.

As monomer (m2) it is possible in principle to use any aliphatic or cycloaliphatic ester of acrylic acid or methacrylic acid having at least 4 carbon atoms in the alcohol residue which is different than (m1), or a mixture of such monomers. Examples include the following: aliphatic esters of acrylic and methacrylic acid having from 4 to 20 carbon atoms in the alcohol residue, such as n-butyl, isobutyl, tert-butyl, 2-ethylhexyl, stearyl, and lauryl acrylate and methacrylate, for example, and also cycloaliphatic esters of acrylic and methacrylic acid, such as cyclohexyl acrylate and cyclohexyl methacrylate, for example. The composition of the monomers (m2) is preferably selected so that polymerization of the monomers (m2) alone gives a polyacrylate resin having a glass transition temperature of from 10 to 100° C., preferably from 20 to 60° C.

As monomer (m3) it is possible in principle to use any ethylenically unsaturated carboxylic acid or a mixture of ethylenically unsaturated carboxylic acids. As monomer (m3) it is preferred to use acrylic acid and/or methacrylic acid.

As monomer (m4) it is possible in principle to use any ethylenically unsaturated monomer that is different than (m1), (m2), and (m3), or a mixture of such monomers. Examples of monomers which may be used as component (m4) include the following: vinylaromatic hydrocarbons, such as styrene, alpha-alkylstyrene and vinyltoluene, amides of acrylic acid and methacrylic acid, such as methacrylamide and acrylamide, nitrites of methacrylic acid and acrylic acid, for example; vinyl ethers and vinyl esters or polysiloxane macromonomers, such as are described in the patents DE-A-38 07 571, DE-A-37 06 095, EP-B-0 358 153, U.S. Pat. No. 4,754,014, DE-A 44 21 823 or WO 92/22615. As monomers (m4) it is preferred to use vinylaromatic hydrocarbons, especially styrene. The composition of the monomers (m4) is preferably selected so that polymerization of the monomers (m4) alone gives a resin having a glass transition temperature of from 70 to 120° C., preferably from 80 to 100° C.

In the coating material of the invention the binders (A) are present advantageously in an amount of from 5 to 95% by weight, with particular preference from 7 to 70% by weight, and in particular from 10 to 50% by weight, based in each case on the overall solids content of the coating material of the invention.

The coating material of the invention further comprises at least one crosslinking agent (B) which contains at least two, in particular three, of the complementary functional groups (b1) described in detail above.

Where the coating material of the invention is a two-component or multicomponent system, polyisocyanates and/or polyepoxides, but especially polyisocyanates, are used as crosslinking agents (B).

Examples of suitable polyisocyanates (B) are organic polyisocyanates, especially what are known as pink polyisocyanates, containing aliphatically, cycloaliphatically, araliphatically and/or aromatically bonded, free isocyanate groups. Preference is given to using polyisocyanates having from 2 to 5 isocyanate groups per molecule and having viscosities of from 100 to 10000, preferably from 100 to 5000, and in particular from 100 to 2000 mPas (at 23° C.). If desired, small amounts of organic solvent, preferably from 1 to 25% by weight based on straight polyisocyanate, may be added to the polyisocyanates in order thus to improve the ease of incorporation of the isocyanate and, where appropriate, to lower the viscosity of the polyisocyanate to a level within the abovementioned ranges. Examples of suitable solvent additives to the polyisocyanates are epoxyethyl propionate, amyl methyl ketone or butyl acetate.

Furthermore, the polyisocyanates (B) may have been hydrophilically or hydrophobically modified in a conventional way.

Examples of suitable polyisocyanates (B) are described, for example, in "Methoden der organischen Chemie", Houben-Weyl, volume 14/2, 4th edition, Georg Thieme Verlag, Stuttgart 1963, page 61 to 70, and by W. Siefken, Liebigs Annalen der Chemie, volume 562, pages 75 to 136. Also suitable, for example, are the polyurethane prepolymers containing isocyanate groups which can be prepared by reacting polyols with an excess of polyisocyanates and which are preferably of low viscosity.

Further examples of suitable polyisocyanates (B) are polyisocyanates containing isocyanurate, biuret, allophanate, iminooxadiazinedone, urethane, urea and/or uretdione groups. Polyisocyanates containing urethane groups, for example, are obtained by reacting some of the isocyanate groups with polyols, such as trimethylolpropane and glycerol, for example. Preference is given to using aliphatic or cycloaliphatic polyisocyanates, especially hexamethylene diisocyanate, dimerized and trimerized hexamethylene diisocyanate, isophorone diisocyanate, 2-isocyanato-propylcyclohexyl isocyanate, dicyclohexylmethane 2,4'-diisocyanate, dicyclohexylmethane 4,4'-diisocyanate or 1,3-bis(isocyanatomethyl)cyclohexane (BIC), diisocyanates from dimer fatty acids, as sold under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Examples of suitable polyepoxides (B) are all known aliphatic and/or cycloaliphatic and/or aromatic polyepoxides, based for example on bisphenol A or bisphenol F. Examples of suitable polyepoxides also include the polyepoxides available commercially under the designations Epikote® from Shell, Denacol® from Nagase Chemicals Ltd, Japan, such as, for example, Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

In the case of the one-component systems, crosslinking agents (B) are used which react at relatively high temperatures with the functional groups of the binders, in order to build up a three-dimensional network. Of course, such crosslinking agents (B) may be used as well in minor amounts in the multicomponent systems. In the context of the present invention, "minor amounts" means a fraction which does not disrupt, let alone prevent entirely, the main crosslinking reaction.

Examples of suitable crosslinking agents (B) of this kind are blocked polyisocyanates. Examples of suitable polyisocyanates are those described above.

Examples of suitable blocking agents are the blocking agents known from the US patent U.S. Pat. No. 4,444,954, such as i) phenols such as phenol, cresol, xylenol, nitrophenol, chlorophenol, ethylphenol, t-butyl-phenol, hydroxybenzoic acid, esters of this acid or 2,5-di-t-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl acetoacetate, methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, aceto-anisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorhexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also mixtures of these blocking agents, especially dimethylpyrazole and triazoles, malonic esters and acetoacetic esters, or dimethylpyrazole and succinimide.

As crosslinking agents (B) it is also possible to use tris(alkoxycarbonylamino)triazines (TACT) of the formula

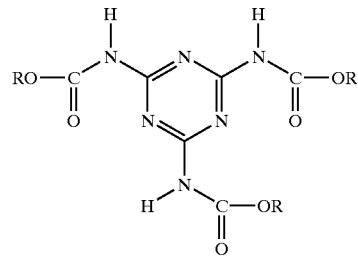

Examples of suitable tris(alkoxycarbonylamino)triazines are described in the patents U.S. Pat. Nos. 4,939,213, 5,084,541 or EP-A-0 624 577. Use is made in particular of the tris(methoxy-, tris(butoxy- and/or tris(2-ethylhexoxycarbonylamino)triazines.

Of advantage are the methyl butyl mixed esters, the butyl 2-ethylhexyl mixed esters and the butyl esters. They have the advantage over the straight methyl ester of better solubility in polymer melts, and also have less of a tendency to crystallize.

In particular it is possible to use amino resins, examples being melamine resins, as crosslinking agents (B). In this context it is possible to use any amino resin suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4 710 542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, volume 13, pages 193 to 207.

Further examples of suitable crosslinking agents (B) are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents (B) are siloxanes, especially siloxanes containing at least one trialkoxy- or dialkoxysilane group.

Further examples of suitable crosslinking agents (B) are polyanhydrides, especially polysuccinic anhydride.

The amount of the crosslinking agent (B) in the coating material of the invention may vary widely and is guided in particular, firstly, by the functionality of the crosslinking agents (B) and, secondly, by the number of crosslinking functional groups (a1) present in the binder (A) and also by the target crosslinking density. The skilled worker is therefore able to determine the amount of the crosslinking agent (B) on the basis of his or her general art knowledge, where appropriate with the assistance of simple rangefinding tests. Advantageously, the crosslinking agent (B) is present in the coating material of the invention in an amount of from 5 to 60% by weight, with particular preference from 10 to 50% by weight, and in particular from 15 to 45% by weight, based in each case on the overall solids content of the coating material of the invention. It is further advisable here to choose the amounts of crosslinking agent (B) and binder (A) such that in the coating material of the invention the ratio of functional groups (b1) in the crosslinking agent (B) and functional groups (a1) in the binder (A) is between 2:1 to 1:2, preferably 1.5:1 to 1:1.5, with particular preference 1.2:1 to 1:1.2, and in particular 1.1:1 to 1:1.1.

If the coating material of the invention is to be curable not only thermally but also with actinic radiation, especially UV radiation and/or electron beams (dual cure), it includes at least one constituent (C) which is curable with actinic radiation.

Suitable constituents (C) include in principle all oligomeric and polymeric compounds which are curable with actinic radiation, especially UV radiation and/or electron beams, and which are customarily used in the field of UV-curable or electron beam-curable coating materials.

It is advantageous to use radiation-curable binders as constituents (C). Examples of suitable radiation-curable binders (C) are (meth)acryloyl-functional, (meth)acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders (C) which are free from aromatic structural units. Preference is therefore given to using urethane (meth)acrylates and/or polyester (meth)acrylates, with particular preference aliphatic urethane acrylates.

The coating material of the invention may further comprise at least one photoinitiator (D). If the coating material or the clearcoat film is to be crosslinked additionally with UV radiation, the use of a photoinitiator (B) is generally necessary. Where it is used, it is present in the coating material of the invention preferably in fractions of from 0.1 to 10% by weight, with particular preference from 1 to 8% by weight, and in particular from 2 to 6% by weight, based in each case on the overall solids content of the coating material of the invention.

Examples of suitable photoinitiators (D) are those of the Norrish II type, whose mechanism of action is based on an intramolecular variant of the hydogen abstraction reactions such as occur diversely in photochemical reactions (reference may be made here, by way of example, to Römpp Chemie Lexikon, 9th expanded and revised edition, Georg Thieme Verlag Stuttgart, Vol. 4, 1991) or cationic photoinitiators (reference may be made here, by way of example, to Römpp Lexikon >>Lacke und Druckfarben<< Georg Thieme Verlag Stuttgart, 1998, pages 444 to 446), especially benzophenones, benzoins or benzoin ethers, or phosphine oxides. It is also possible, for example, to use the products available commercially under the names Irgacure® 184, Irgacure® 1800 and Irgacure® 500 from Ciba Geigy, Grenocure® MBF from Rahn, and Lucirin® TPO from BASF AG.

In addition to the photoinitiators (D), it is possible to use customary sensitizers (D) such as anthracene in effective amounts.

Furthermore, the coating material may comprise at least one thermal crosslinking initiator (E). At from 80 to 120° C., these initiators form free radicals which start the crosslinking reaction. Examples of thermolabile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles, or benzpinacol silyl ethers. Particular preference is given to C—C-cleaving initiators, since their thermal cleavage does not produce any gaseous decomposition products which might lead to defects in the coating film. Where used, their mounts are generally from 0.1 to 10%, preferably from 0.5 to 8%, and in particular from 1 to 5%, by weight, based in each case on the overall solids content of the coating material of the invention.

Moreover, the coating material may comprise at least one reactive diluent (F) curable thermally and/or with actinic radiation.

Examples of suitable thermally crosslinkable reactive diluents (F) are branched, cyclic and/or acyclic $C_9$–$C_{16}$ alkanes functionalized with at least two hydroxyl groups, preferably dialkyloctanediols, especially the positionally isomeric diethyloctanediols.

Further examples of suitable thermally crosslinkable reactive diluents (F) are oligomeric polyols obtainable from oligomeric intermediates themselves obtained by metathesis reactions from acyclic monoolefins and cyclic monoolefins, by hydroformylation and subsequent hydrogenation; examples of suitable cyclic monoolefins are cyclobutene, cyclopentene, cyclohexene, cyclooctene, cycloheptene, norbornene or 7-oxanorbornene; examples of suitable acyclic monoolefins are present in hydrocarbon mixtures obtained in petroleum processing by cracking ($C_5$ cut).

Examples of suitable oligomeric polyols for use in accordance with the invention have a hydroxyl number (OHN) of from 200 to 450, a number-average molecular weight Mn of from 400 to 1000, and a mass-average molecular weight Mw of from 600 to 1 100.

Further examples of suitable thermally crosslinkable reactive diluerts (F) are hyperbranched compounds containing a tetrafunctional central group, derived from ditrimethylolpropane, diglycerol, ditrimethylol-ethane, pentaerythritol, tetrakis(2-hydroxyethyl)methane, tetrakis (3-hydroxypropyl)methane or 2,2-bishydroxymethyl-1,4-butanediol (homopentaerythritol). These reactive diluents may be prepared in accordance with the customary and known methods of preparing hyperbranched and dendrimeric compounds. Suitable synthesis methods are described, for example, in the patents WO 93/17060 or WO 96/12754 or in the book by G. R. Newkome, C. N. Moorefield and F. Vögtle, "Dendritic Molecules, Concepts, Syntheses, Perspectives", VCH, Weinheim, N.Y., 1996.

Further examples of suitable reactive diluents (F) are polycarbonatediols, polyesterpolyols, poly(meth)-acrylatediols or hydroxyl-containing polyadducts.

Examples of suitable reactive solvents which may be used as reactive diluents (F) are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate and 3-methyl-3-methoxybutanol, and also derivatives based on propylene glycol, e.g., isopropoxypropanol.

Examples of reactive diluents (F) used that may be crosslinked with actinic radiation are the above-detailed polysiloxane macromonomers for inventive use, (meth) acrylic acid and other esters thereof, maleic acid and its esters, including monoesters, vinyl acetate, vinyl ethers, vinylureas, and the like. Examples that may be mentioned include alkylene glycol di(meth)acrylate, polyethylene glycol di(meth)acrylate, 1,3-butanediol di(meth)acrylate, vinyl (meth)acrylate, allyl (meth)acrylate, glycerol tri(meth) acrylate, trimethylolpropane tri(meth)acrylate, trimethylolpropane di(meth)acrylate, styrene, vinyltoluene, divinylbenzene, pentaerythritol tri(meth)acrylate, pentaerythritol tetra(meth)acrylate, dipropylene glycol di(meth) acrylate, hexanediol di(meth)acrylate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl (meth)acrylate, dimethylacrylamide, and dicyclopentyl acrylate, and the long-chain linear diacrylates described in EP-A-0 250 631 and having a molecular weight of from 400 to 4000, preferably from 600 to 2500. The two acrylate groups may, for example, be separated by a polyoxybutylene structure. Further candidates for use are 1,12-dodecyl diacrylate and the reaction product of 2 moles of acrylic acid with one mole of a dimeric fatty alcohol having generally 36 carbon atoms. Mixtures of the abovementioned monomers are also suitable.

Preferred for use as reactive diluents (F) are mono-and/or diacrylates, such as isobornyl acrylate, hexanediol diacrylate, tripropylene glycol diacrylate, Laromer® 8887 from BASF AG, and Actilane® 423 from Akcros Chemicals Ltd., UK, for example. Particular preference is given to the use of isobornyl acrylate, hexanediol diacrylate, and tripropylene glycol diacrylate.

Where used, the reactive diluents (F) are employed in an amount of preferably from 2 to 70%, with particular preference from 10 to 65%, and in particular from 15 to 50%, by weight, based in each case on the overall solids content of the coating material of the invention.

The coating material may further comprise at least one customary and known coatings additive (G) in effective amounts, i.e., in amounts of preferably up to 40% by weight, with particular preference up to 30% by weight, and in particular up to 20% by weight, based in each case on the overall solids content of the coating material. It is essential that the coatings additives (G) do not adversely affect the transparency and clarity of the coating material of the invention.

Examples of suitable coatings additives (G) are

UV absorbers;

light stabilizers such as HALS compounds, benzotriazoles or oxalanilides;

free-radical scavengers;

crosslinking catalysts such as dibutyltin dilaurate or lithium decanoate;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes;

adhesion promoters such as tricyclodecanedimethanol;

leveling agents;

film-forming auxiliaries such as cellulose derivatives;

transparent fillers; refer here to Römpp Lexikon >>Lacke und Druckfarben<< Georg Thieme Verlag, Stuttgart, 1998, pages 250 to 252;

sag control agents such as ureas, modified ureas and/or silicas, as described, for example, in the references EP-A-192 304, DE-A-23 59 923, DE-A-18 05 693, WO 94/22968, DE-C-27 51 761, WO 97/12945 or "farbe+ lack", 11/1992, pages 829 ff.;

rheology control additives such as those known from the patents WO 94/22968, EP-A-0 276 501, EP-A-0 249 201 or WO 97/12945; crosslinked polymeric microparticles, as disclosed, for example, in EP-A-0 008 128; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly (meth)acrylamide, poly(meth)acrylic acid, polyvinylpyrrolidone, styrene maleic anhydride copolymers or ethylene maleic anhydride copolymers and their derivatives, or hydrophobically modified ethoxylated urethanes or polyacrylates;

flame retardants and/or flatting agents.

Further examples of suitable coatings additives (G) are described in the textbook >>Lackadditive<< [Additives for coatings] by Johan Bieleman, Wiley-VCH, Weinheim, N.Y., 1998.

Nonaqueous coating materials of the invention may contain from 20 to 70% by weight, preferably from 40 to 60% by weight (based on the ready-to-apply coating material), of organic solvents (H), such as aliphatic, aromatic and/or cycloaliphatic hydrocarbons, alkyl esters of acetic acid or propionic acid, alkanols, ketones, glycol ethers and/or glycol ether esters, for example.

The coating material of the invention may be present in various forms.

Accordingly, given the appropriate choice of its above-described constituents (A) and (B) and also, where appropriate, (C), (D), (E), (F), (G) and/or (H), it may be in the form of a liquid coating material which is substantially free from organic solvents and/or water (100% system).

Alternatively, the coating material may be a solution or dispersion of the above-described constituents in organic solvents (H) and/or water. It is a further advantage of the coating material of the invention that in this case solids contents of up to more than 80% by weight, based on the coating material, can be set.

Furthermore, given an appropriate choice of its above-described constituents, the coating material of the invention may be a powder clearcoat material. For this purpose the constituent (B) may be in microencapsulated form if it is a polyisocyanate. This powder clearcoat powder may then, if desired, be dispersed in water to give a powder slurry clearcoat material.

The coating material of the invention may be a two-component or multicomponent system in which at least constituent (B) is stored separately from the other constituents and is added to them only shortly before use. In this case the coating material of the invention may also be aqueous, with constituent (B) being present preferably in a component comprising a solvent (H).

Additionally, the coating material of the invention may be part of a so-called mixer system or modular system, as described, for example, in the patents DE-A-41 10 520, EP-A-0 608 773, EP-A-0 614 951 or EP-A-0 471 972.

The preparation of the coating material of the invention from its constituents (A) and (B) and also, where appropriate, (C), (D), (E), (F), (G) and/or (H) has no special features but instead takes place in a conventional and known manner by mixing the constituents in suitable mixing units such as stirred tanks, dissolvers or extruders in accordance with the processes which are suitable for preparing the respective coating materials, these processes being as described, for example, in the patents set out at the outset.

The coating material of the invention serves for producing the clearcoat systems KL and multicoat paint systems ML of the invention on primed or unprimed substrates.

Suitable substrates include all surfaces to be coated that are not damaged by curing of the coating systems present thereon using heat and, if desired, actinic radiation; examples include metals, plastics, wood, ceramic, stone, textile, fiber composites, leather, glass, glass fibers, glass wool and rock wool, mineral-bound and resin-bound building materials, such as plasterboard panels and cement slabs or roof shingles. Accordingly, the clearcoat system KL of the invention is also suitable for applications outside of automotive finishing, especially for the coating of furniture and for industrial coating, including coil coating and container coating. In the context of industrial coatings it is suitable for coating virtually all parts for private or industrial use such as radiators, domestic appliances, small metal parts, hub caps or wheel rims. In particular, the clearcoat system KL of the invention is suitable as a coating over basecoats, preferably in the automobile industry. It is particularly suitable as a clearcoat over aqueous basecoats based on polyesters, polyurethane resins, and amino resins, particularly as part of the multicoat paint system ML of the invention.

Using the clearcoat system KL of the invention or the multicoat paint system ML of the invention it is also possible in particular to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1). The plastics to be coated may of course also be polymer blends, modified plastics or fiber-reinforced plastics. It is also possible to employ the plastics which are customarily used in vehicle construction, particularly motor vehicle construction.

Nonfunctionalized and/or nonpolar substrate surfaces may be subjected prior to coating in a known manner to a pretreatment, such as with a plasma or by flaming.

The clearcoat system KL of the invention can be produced by applying, in a first process step, at least one clearcoat film I of a coating material I curable with actinic radiation and/or thermally to the surface of the substrate.

In the context of the present invention, accordingly, it is possible to apply only one clearcoat film I of the coating material I. It is possible, however, to apply two or more such clearcoat films I. In this case, different coating materials I may be used for building up the clearcoat films I. In the great majority of cases, however, the desired profile of properties of the clearcoat system KL of the invention is achieved with one clearcoat film I.

The clearcoat film I is applied in a wet film thickness such as to give, after curing, in the finished clearcoat system KL of the invention, a dry film thickness of from 10 to 100 $\mu$m, preferably from 15 to 75 $\mu$m, with particular preference from 20 to 55 $\mu$m, and in particular from 20 to 35 $\mu$m.

The application of the coating material I for the purpose of producing the clearcoat film I may take place by any customary application methods, such as spraying, knife coating, brushing, flow coating, dipping or rolling, for example. It is preferred to employ spray application methods, such as compressed air spraying, airless spraying, high speed rotation, electrostatic spray application (ESTA), for example, alone or in conjunction with hot spray application such as hot air spraying, for example. The applications may be carried out at temperatures of max. 70 to 80° Celsius, so that suitable application viscosities are achieved without the short period of thermal stress being accompanied by any change in or damage to the coating material I or its overspray, which may be intended for reprocessing. For instance, hot spraying may be configured in such a way that the coating material I is heated only very shortly in or shortly before the spray nozzle.

The spray booth used for application may be operated, for example, with an optionally thermostatable circulation system which is operated with a suitable absorption medium for the overspray, an example being the coating material I itself.

Where the coating material I is also curable with actinic radiation, the application is carried out under illumination with visible light having a wavelength of more than 550 nm or in the absence of light. This prevents material change or damage to the coating material I and to the overspray.

The application methods described above can of course also be employed for producing the clearcoat film II or the basecoat film III and also any further coating films as part of the KL and ML processes of the invention.

In accordance with the invention, the clearcoat film I, following its application, is partly or fully cured.

As far as the method is concerned, the partial curing is no different from a customary full curing of a coating film. In this case, crosslinking only takes place for a sufficient time that the clearcoat film I firstly has a dimensional stability which is sufficient for the purposes of the KL or ML processes of the invention and secondly contains a sufficient amount of the above-described crosslinkable functional groups (a1) and (b2) (complementary functional groups) for the postcrosslinking and for the intercoat adhesion. The extent of partial curing may therefore vary widely and is guided by the requirements of the particular case in hand. It may, however, be determined by the skilled worker on the basis of his or her general art knowledge and/or on the basis of simple preliminary tests. Preferably from 0.5 to 99.5 mol %, with particular preference from 1 to 99 mol %, with very particular preference from 2 to 90 mol %, and in particular from 3 to 80 mol % of the crosslinkable functional groups present in the coating material I are reacted. It is very particularly preferred if, following its partial curing, the clearcoat film I is still tacky.

However, it is also possible for the clearcoat film(s) I to be fully cured. Subsequently, the outer surface of the clearcoat(s) I may be roughened or abraded in order to improve intercoat adhesion, prior to the application of the clearcoat film II. Suitable in this context are the customary and known roughening methods such as abrading with sandpaper or steel wool or files or brushes. However, it is a particular advantage of the KL and ML processes of the invention that abrading of the clearcoat I is generally unnecessary.

In accordance with the invention, the clearcoat film I may be partially or fully cured thermally or both thermally and with actinic radiation.

Curing may take place after a certain resting time. This time may have a duration of from 30 s to 2 h, preferably from 1 min to 1 h, and in particular from 1 min to 30 min. The resting time serves, for example, for the leveling and devolatilization of the clearcoat film I or for the evaporation of volatile constituents such as solvents, water or carbon dioxide if the coating material I has been applied using supercritical carbon dioxide as solvent. The resting time may be shortened and/or assisted by the application of elevated temperatures up to 80° Celsius, provided there is no damage or change to the clearcoat film I during this time, such as premature complete crosslinking,.for instance.

The obligatory thermal curing has no special features as far as this method is concerned, but instead takes place in accordance with the customary and known methods such as heating in a forced air oven or irradiation using IR lamps. Thermal curing may take place in stages. Thermocuring takes place advantageously at a temperature of from 50 to 100° C., with particular preference from 80 to 100° C., and in particular from 90 to 100° C., over a time of from 1 min up to 2 h, with particular preference 2 min up to 1 h, and in particular from 3 min to 30 min. If substrates are used which have a high thermal load-bearing capacity, thermal crosslinking may also be conducted at temperatures above 100° C. In general it is advisable in this case not to exceed temperatures of 180° C., preferably 160° C., and in particular 140° C.

Where employed, curing with actinic radiation takes place using UV radiation or electron beams. Where appropriate, it may be carried out with or supplemented by actinic radiation from other radiation sources. In the case of electron beams it is preferred to operate under an inert gas atmosphere, This may be ensured, for example, by supplying carbon dioxide and/or nitrogen directly to the surface of the clearcoat film I.

In the case of curing with UV radiation as well it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window up to 405 nm, or electron beam sources. Their arrangement is known in principle and may be adapted to the circumstances of the workpiece and the process parameters. In the case of workpieces of complex shape, such as automobile bodies, those regions not accessible to direct radiation (shadow regions) such as cavities, folds and other structural undercuts may be (partly) cured using pointwise, small-area or all-round emitters in conjunction with an automatic movement means for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

(Partial) curing here may take place in stages, i.e., by multiple exposure to light or actinic radiation. It may also take place alternatingly, i.e., by curing alternately with UV radiation and electron beams.

Where thermal curing and actinic radiation curing are employed together, these methods may be used simultaneously or alternately. Where the two curing methods are used alternately, it is possible, for example, to commence with the thermal curing and to end with the actinic radiation curing. In other cases it may prove advantageous to commence and to end with the actinic radiation curing. The skilled worker is able to determine the curing method most advantageous for the particular case in hand on the basis of his or her general art knowledge, where appropriate with the assistance of simple preliminary tests.

Of course, the curing methods described above may also be employed while producing the clearcoat II or the basecoat III and also, where appropriate, further coats as part of the KL or ML processes of the invention.

In a procedure in accordance with the invention, a further clearcoat film II of a coating material II, curable thermally and, if desired, with actinic radiation, is applied to the surface of the clearcoat film(s) I, after which—if the clearcoat film I was partly cured—the clearcoat films I and II together, or—if the clearcoat film I was fully cured—the clearcoat film II alone, are or is cured thermally and, if desired, with actinic radiation, using here again the methods and apparatus described above.

In accordance with the invention, the coating material I for producing the clearcoat film I is the coating material of the invention. In this case, the coating material II for producing the clearcoat film II may be a customary and known coating material as described in the patents set out at the outset. Alternatively, the coating material II may also be a coating material of the invention.

With this variant of the clearcoat system KL of the invention and of the KL process of the invention, in which the coating material I is the coating material of the invention and the coating material II is a customary and known coating material, particular advantages arise in respect of the intercoat adhesion and the adhesion to the substrate.

If, in this variant of the clearcoat system KL of the invention and of the KL process of the invention, the coating material II of the invention is likewise used as coating material II, very particular advantages arise additionally in respect of the weathering stability and scratch resistance.

The clearcoat film II is applied in a wet film thickness such that after curing, in the finished clearcoat system KL of the invention, there is a dry film thickness of from 10 to 100 μm, preferably from 15 to 75 μm, with particular preference from 20 to 55 μm, and in particular from 20 to 35 μm.

In the great majority of cases, however, it is entirely sufficient for an outstanding intercoat adhesion, weathering stability, and scratch resistance if only the clearcoat film II is produced from a coating material II of the invention and a conventional coating material is used for producing the clearcoat film I (second variant of the clearcoat system KL of the invention and of the KL process of the invention). Accordingly, this variant is frequently also preferred on economic grounds alone.

The ratio of the film thicknesses of clearcoat film I to clearcoat film II may vary widely; however, particularly in the case of the second variant, it is also of advantage for economic reasons if the clearcoat film I is the thicker of the two films.

The above-described clearcoat systems KL of the invention, produced preferably by means of the KL process of the invention, may also be part of the multicoat paint systems ML of the invention. These systems are advantageously produced by means of the ML process of the invention.

For this purpose, in the first process step the clearcoat film(s) I is or are applied not to the primed or unprimed substrates but instead to at least one color and/or effect basecoat film III which is present on said substrates and is produced from a pigmented coating material III which is curable thermally and, if desired, with actinic radiation.

In accordance with the invention it is of advantage to apply the clearcoat film(s) I by the wet-on-wet process to the dried or flashed-off, but uncured basecoat film III and to cure it (them) either partly and alone, partly and together with the basecoat III, or fully together with the basecoat III, thermally and, if desired, with actinic radiation. Where full curing is carried out, the outer surface of the clearcoat film(s) I may be abraded as described above before the clearcoat film II is applied.

Subsequently, in accordance with the invention, a further clearcoat film II of a coating material II, curable thermally and, if desired, with actinic radiation, is applied to the surface of the clearcoat film(s) I, and then—if the underlying coating films have not yet been fully cured—the clearcoat films I and II, and the basecoat film III, together, or—if these coating films have already been fully cured—the clearcoat film II alone, are or is cured thermally and, if desired, with actinic radiation.

In this context it is possible to employ the application and curing methods and apparatus described above.

As described above in connection with the clearcoat system KL of the invention and the KL process of the invention, it is also possible with the multicoat paint system ML of the invention and the ML process of the invention for the coating material II and/or the coating material I, but in particular the coating material II, to be a coating material of the invention.

Suitable material as coating material III for producing the basecoat film III include the customary and known basecoat materials, especially aqueous basecoat materials, as described in the patents set out at the outset. Advantageously, the coating materials III are applied in a wet film thickness such that the basecoats II, following their complete curing, advantageously have a dry film thickness of from 5 to 25 $\mu$m, with particular preference from 10 to 20 $\mu$m, and in particular from 12 to 18 $\mu$m.

It is, however, also possible to use the pigmented powder coating material known from the European patent EP-A-0 844 286 which is curable thermally and with actinic radiation. It comprises a saturated binder and a second resin, copolymerizable therewith, and also a photoinitiator and a thermal initiator, and is therefore curable thermally and with actinic radiation. The powder basecoat film may be cured on the surface with UV light and cured thermally in the regions close to the substrate.

The clearcoat system KL of the invention exhibits outstanding optical, mechanical, and chemical properties. Thus, it is free from any surface defects such as shrinkage (wrinkling). It is of outstanding transparency and scratch resistance. Delamination owing to deficient intercoat adhesion is not observed. The etch resistance is outstanding. Accordingly, the coating material for inventive use is outstandingly suitable for finishing all conventional clearcoat systems without the need for extensive refitting of the coating lines at the customer's facility. This constitutes a further particular advantage of the multicoat paint systems ML of the invention. The latter possess, in particular, outstanding color brilliance and/or an outstanding accentuation of the optical effects such as metallic effects, pearlescent effects or flop effects.

EXAMPLES AND COMPARATIVE EXPERIMENTS

Preparation Examples 1 to 6

1. The Preparation of a Polyacrylate (A) which Can Be Used Inventively

A laboratory reactor having a useful volume of 4 l, equipped with a stirrer, two dropping funnels for the monomer mixture and initiator solution, respectively, a nitrogen inlet tube, thermometer, and reflux condenser, was charged with 640.6 g of an aromatic hydrocarbons fraction having a boiling range of 158–172° C. The solvent was heated to 140° C. After 140° C. had been reached, a monomer mixture of 597 g of ethylhexyl acrylate, 173.2 g of hydroxyethyl methacrylate, 128.4 g of styrene, 385.2 g of 4-hydroxybutyl acrylate and 3.2 g of a hexaacrylate-functional polysiloxane macromonomer (methylsiloxane resin Tego® LA-S 517 from Tego Chemie Service GrnbH; active substance content: 60% by weight) was metered into the reactor at a uniform rate over the course of 4 hours and an initiator solution of 25.6 g of t-butyl perethylhexanoate in 50 g of the aromatic solvent described was metered into the reactor at a uniform rate over the course of 4.5 hours. The metered additions of the monomer mixture and the initiator solution were commenced simultaneously. After the end of the metered addition of initiator, the reaction mixture was held at 140° C. for a further two hours and then cooled. The resulting polymer solution had a solids content of 65%, determined in a forced air oven at 130° C. for 1 h.

2. The Preparation of a Conventional Polyacrylate (A)

Preparation Example 1 was repeated but without using any polysiloxane macromonomer for inventive use.

3. The Preparation of a Polyacrylate as Grinding Resin

A laboratory reactor having a useful volume of 4 l, equipped with a stirrer, two dropping funnels for the monomer mixture and initiator solution, respectively, a nitrogen inlet tube, thermometer, and reflux condenser, was charged with 720 g of an aromatic hydrocarbons fraction having a boiling range of 158–172° C. The solvent was heated to 140° C. After 140° C. had been reached, a monomer mixture of 450 g of 2-ethylhexyl methacrylate, 180 g of n-butyl methacrylate, 210 g of styrene, 180 g of hydroxyethyl acrylate, 450 g of 4-hydroxybutyl acrylate and 30 g of acrylic acid was metered into the reactor at a uniform rate over the course of 4 hours and an initiator solution of 150 g of t-butyl perethylhexanoate in 90 g of the aromatic solvent described was metered into the reactor at a uniform rate over the course of 4.5 hours. The metered additions of the monomer mixture and the initiator solution were commenced simultaneously. After the end of the metered addition of initiator, the reaction mixture was held at 140° C. for a further two hours and then cooled. The resulting polymer solution had a solids content of 65%, determined in a forced air oven at 130° C. for 1 h, an acid number of 15 and a viscosity of 3 dPas (measured on a 60% dilution of the polymer solution in the aromatic solvent described, using an ICI cone and plate viscometer at 23° C.).

4. The Preparation of a Thixotroping Paste

A stirred laboratory mill from Vollrath was charged with 800 g of millbase, consisting of 323.2 g of the polyacrylate from Preparation Example 3, 187.2 g of butanol, 200.8 g of xylene and 88.8 g of Aerosil® 812 (Degussa AG, Hanau), together with 1100 g of quartz sand (grain size 0.7–1 mm), and this composition was dispersed with water cooling for 30 minutes.

5. The Preparation of a Crosslinking Agent (B)

A 4 l stainless steel reactor was charged with 40 parts by weight of Basonat® 190 B/S (isocyanurate based on hexamethylene diisocyanate from BASF Aktiengesell-schaft) and 16.4 parts by weight of solvent naphtha, and this initial charge was heated to 50° C. Over the course of 4 hours, 26.27 parts by weight of diethyl malonate, 6.5 parts by weight of ethyl acetoacetate and 0.3 part by weight of catalyst solution (sodium ethylhexanoate) were metered in at a uniform rate. Thereafter, the temperature was raised to 70° C. When an isocyanate equivalent weight of from 5900 to 6800 had been reached, 1.03 parts by weight of 1,4-cyclohexyl-dimethanol were added with stirring at 70° C. over the course of 30 minutes. When an isocyanate equivalent weight of ·13000 had been reached, 5 parts by weight of n-butanol were added. The temperature was lowered to 50° C. and the resulting blocked polyisocyanate was diluted with n-butanol to a theoretical solids content of 68% by weight.

6. The Preparation of a Further Conventional Polyacrylate (A)

A laboratory reactor having a useful volume of 4 l, equipped with a stirrer, two dropping funnels for the monomer mixture and initiator solution, respectively, a nitrogen inlet tube, thermometer, and reflux condenser, was charged with 720 g of an aromatic hydrocarbons fraction having a boiling range of 158–172° C. The solvent was heated to 140° C. After 140° C. had been reached, a monomer mixture of 427.5 g of n-butyl acrylate, 180 g of n-butyl methacrylate, 450 g of styrene, 255 g of hydroxyethyl acrylate, 165 g of 4-hydroxybutyl acrylate and 22.5 g of acrylic acid was metered into the reactor at a uniform rate over the course of 4 hours and an initiator solution of 120 g of t-butyl perethylhexanoate in 90 g of the aromatic solvent described was metered into the reactor at a uniform rate over the course of 4.5 hours. The metered additions of the monomer mixture and the initiator solution were commenced simultaneously. After the end of the metered addition of initiator, the reaction mixture was held at 140° C. for a further two hours and then cooled. The resulting polymer solution had a solids content of 60%, determined in a forced air oven at 130°C. for 1 h, an acid number of 13 mg KOH/g, an OH number of 116 mg KOH/g, a glass transition temperature Tg of 3.23°C., and a viscosity of 9 dPas (measured on a 60% dilution of the polymer solution in the aromatic solvent described, using an ICI cone and plate viscometer at 23° C.).

Example 1 and Comparative Experiment C1

The Preparation of an Inventive One-component Clearcoat Material (Example 1) and of a Noninventive One-Component Clearcoat Material (Comparative Experiment C1)

An inventive one-component clearcoat material (Example 1) and a conventional one-component clearcoat material (Comparative Experiment C1) were prepared from the constituents listed in Table 1, by mixing.

TABLE 1

Composition of the inventive one-component clearcoat material (Example 1) and of the conventional one-component clearcoat material (Comparative Experiment C1)

| Constituents | Example 1 (parts by weight) | Comparative Exp. C2 (parts by weight) |
|---|---|---|
| Binders | | |
| Polyacrylate (A) from Preparation Example 2 | 34.7 | 50.0 |
| Polyacrylate (A) from Preparation Example 1 (inventive) | 15.3 | — |
| Thixotroping paste from Preparation Example 4 | 3.0 | 3.0 |
| Crosslinking agent | | |
| TACT | 26.6 | 26.6 |
| Other constituents: | | |
| Substit. Hydroxyphenylbenzo-triazole (95% in xylene) (Tinuvin ® 292 from Ciba) | 1.0 | 1.0 |
| Amino ether-modified 2,2,6,6-tetramethylpipery-dinyl ester (Tinuvin ® 400 from Ciba) | 1.2 | 1.2 |
| Commercial solution of a polyether-modified poly-dimethylsiloxane (5% in xylene) Byk ® 310 (Byk Chemie) | 1.4 | 1.4 |
| Butyl diglycol acetate | 5.5 | 5.5 |
| Butyl glycol acetate | 5.5 | 5.5 |
| Solvesso ® 150 | 5.8 | 5.8 |
| Total: | 100 | 100 |

TACT = commercial tris(alkoxycarbonylamino)triazine from CYTEC

The inventive clearcoat material of Example 1 had a flow time of 23 s in the DIN4 cup at 21° C. In accordance with the invention, it was used as clearcoat material II.

10 The noninventive clearcoat material of Comparative Experiment C1 had a flow time of 28 s in the DIN4 cup at 21° C.

Example 2 and Comparative Experiment C2

The Production of an Inventive Multicoat Paint System ML (Example 2) and of a Noninventive Multicoat Paint System (Comparative Experiment C2)

For producing the multicoat paint system ML of the invention, of Example 2, and the noninventive multicoat paint system of Comparative Experiment C2, first of all a clearcoat material I (undercoat clearcoat) was prepared by mixing the constituents indicated in Table 2.

TABLE 2

The composition of the clearcoat material I

| Constituents | Parts by weight |
|---|---|
| Conventional polyacrylate from Preparation Example 6 | 43.4 |
| Crosslinking agent from Preparation Example 5 | 9.0 |
| Commercial butanol-etherified melamine- | 16.0 |

TABLE 2-continued

The composition of the clearcoat material I

| Constituents | Parts by weight |
|---|---|
| formaldehyde resin (60% in butanol/xylene) | |
| Setalux ® C91756 (commercial thixotropic agent from Akzo) | 13.5 |
| Substituted hydroxyphenyl-triazine (65% in xylene) (Cyagard ® 1164L) | 0.6 |
| Amino ether-modified 2,2,6,6-tetramethylpiperydinyl ester (Tinuvin ® 123 from Ciba) | 0.8 |
| Byk ® 390 (Byk Chemie) | 0.05 |
| Byk ® 310 (Byk Chemie) | 0.15 |
| Tego ® LAG 502 | 0.2 |
| Butanol | 11.4 |
| Solventnaphtha ® | 2.5 |
| Xylene | 0.9 |
| Butyl diglycol acetate | 1.5 |
| Total: | 100 |

The clearcoat material I had a flow time of 46 s in the DIN4 cup at 21° C. For application it was adjusted to a flow time of 28 s using 8 parts by weight of a diluent (organic solvent mixture).

In order to produce the test panels, an electrocoat material (dry film thickness 22 µm) and a water-based surfacer (FU63-9400 from BASF Coatings AG) were applied in succession and baked (dry film thickness 30 µm). The electrocoat material was baked at 170° C. for 20 minutes and the surfacer at 160° C. for 20 minutes. Then a blue aqueous basecoat material (water percolor basecoat FW 05-513P from BASF Coatings AG) was applied with a film thickness of 15–18 µm and flashed off at 80° C. for 10 minutes.

The clearcoat material I (cf. Table 2) was then applied wet-on-wet and baked at 135° C. for 30 minutes so as to give a dry film thickness of 35 µm.

For Example 2, the test panels obtained in this way were overcoated, without intermediate sanding, with the inventive clearcoat material II (cf. Table 1). The resulting clearcoat film II was baked at 140° C. for 20 minutes so as to give a dry film thickness of 20 µm.

For Comparative Experiment C2, the test panels obtained in this way were overcoated, without intermediate sanding, with the noninventive clearcoat material (cf. Table 1). The resulting clearcoat film II was baked likewise at 140° C. for 20 minutes so as to give a dry film thickness of 20 µm.

The adhesion of the inventive multicoat paint system ML of Example 2 was determined after storage for 24 hours at room temperature, using the crosshatch test in accordance with DIN 53151 (2 mm) [rating 0 to 5]. There was no delamination: rating GTC. In the case of the noninventive multicoat paint system of Comparative Experiment C2, on the other hand, there was delamination of the clearcoat: rating GT4.

The scratch resistance of the multicoat paint system on the test panels was assessed as follows after storage at room temperature for 24 hours, using the BASF brush test which is described in FIG. 2 on page 28 of the article by P. Betz and A. Bartelt, Progress in Organic Coatings, 22 (1993), pages 27–37, albeit with modification in respect of the weight used (2000 g instead of the 280 g specified therein):

In the test, the film surface was damaged with a woven mesh which was loaded with a weight. The woven mesh and the film surface were wetted generously with a laundry detergent solution. By means of a motor drive, the test panel was moved backward and forward under the woven mesh in reciprocating movements.

The test element was an eraser (4.5×2.0 cm, broad side perpendicular to the direction of scratching) around which was stretched a woven nylon mesh (No. 11, 31 µm mesh size, Tg 50° C.) The applied weight was 2000 g.

Prior to each test, the woven mesh was replaced, with the running direction of the woven meshes parallel to the direction of scratching. Using a pipette, about 1 ml of a freshly stirred 0.25% Persil solution was applied before the eraser. The speed of rotation of the motor was set so as to perform 80 double strokes within a period of 80 s. After the test, the remaining detergent liquid was rinsed off with cold tap water and the test panels were blown dry with compressed air. Measurements were made of the gloss to DIN 67530 before and after damage and after regeneration (reflow). The direction of measurement was perpendicular to the direction of scratching. The results obtained here are compared with one another in Table 3. They demonstrate the superior scratch resistance and excellent reflow behavior of the inventive multicoat paint system ML.

TABLE 3

The scratch resistance by the brush test, and the reflow behavior

| Properties | Example 2 | Comparative Experiment C2 |
|---|---|---|
| Initial gloss: | 87.5 | 88.2 |
| Gloss after exposure at room temperature: | 79.2 | 73.3 |
| Gloss after storage at 40° C. for two hours: | 83.5 | 76.4 |
| Gloss after storage at 60° C. for two hours: | 83.8 | 78.3 |
| Reflow 40° C.: | 51.81 | 20.81 |
| Reflow 60° C.: | 55.42 | 33.56 |

The adhesion properties of the inventive multicoat paint system ML of Example 2 and of the noninventive multicoat paint system of Comparative Experiment C2 were determined by means of the crosshatch test following exposure to condensation. The results can be found in Table 4. They underscore again the superior bond strength of the inventive multicoat paint system ML.

TABLE 4

Constant condensation climate test (CCC test)[a] and adhesion properties of the inventive multicoat paint system ML of Example 2 and of the multicoat paint system of Comparative Experiment 2

| | Example 2 | Comparative Exp. 2 |
|---|---|---|
| Adhesion by the crosshatch test[b] | GT1 | GT5 |

[a]customary method of evaluating the resistance of coating materials to exposure to long-term humidity (240 hours, 100% rel. humidity, 40° C., details in the test specification MKK0001A, issue A/14.05.1996, available from BASF Coatings AG). The evaluation is made one hour after the end of condensation exposure.
[b]crosshatch to DIN 53151 (2 mm) after 240 hours of SCC and 24 hours of regeneration; rating 0 to 5: 0 = best score; 5 = worst score

Example 3 and Comparative Experiment C3

The Production of an Inventive Multicoat Paint System ML (Example 3) and of a Noninventive Multicoat Paint System (Comparative Experiment C3)

For determining the surface properties, a commercial black aqueous basecoat material (FV95-9108 from BASF Coatings AG) was applied to vertical steel panels and flashed off at 80° C. for 10 minutes. The aqueous basecoat material was applied in a wet film thickness such that the dry film thickness after baking was from 12 to 15 µm.

The clearcoat material I (cf. Table 2) was then applied wet-on-wet and baked at 135° C. for 30 minutes, giving a dry film thickness of 35 µm.

For Example 3, the test panels thus obtained, without intermediate sanding, were overcoated in vertical position with the inventive clearcoat material II of Example 1 (cf. Table 1). The resulting inventive clearcoat film II was baked at 140° C. for 20 minutes, giving a dry film thickness of 20 µm.

For Comparative Experiment C3, the test panels, without intermediate sanding, were overcoated in vertical position with the noninventive clearcoat material of Comparative Experiment C1 (cf. Table 1). The resulting inventive clearcoat film II was baked likewise at 140° C. for 20 minutes, giving a dry film thickness of 20 µm.

The surface properties of the resulting inventive multicoat paint system ML of Example 3 and of the noninventive multicoat paint system of Comparative Experiment C3 were assessed visually and by means of the WaveScan method. The results can be found in Table 5. They demonstrate that the inventive multicoat paint system ML has an outstanding surface which is substantially free from coarse and fine textures.

TABLE 5

Leveling properties (vertical) of the inventive multicoat paint system ML of Example 3 and of the multicoat paint system of Comparative Experiment C3

|  | Example 3 | Comparative Exp. 3 |
|---|---|---|
| Leveling (visual) | very smooth surface | Surface very irregular |
| Leveling (measured by instrument)[a] |  |  |
| Wavescan/longwave | 1.3 | 12.7 |
| Wavescan/shortwave | 1.1 | 8.8 |

[a]Instrument: Byk/Gardner - Wave scan plus

What is claimed is:

1. A coating material curable thermally and, if desired, with actinic radiation, comprising
   A) at least one binder containing at least two functional groups, and
   B) at least one crosslinking agent containing at least two functional groups, wherein the functional groups of the binder are able to undergo thermal crosslinking reactions with complementary functional groups in the crosslinking agent, and the functional groups of the crosslinking agent are able to undergo thermal crosslinking reactions with complementary functional groups in the binder,
   and optionally at least one of,
   C) at least one constituent that is crosslinkable with actinic radiation,
   D) at least one photoinitiator,
   E) at least one thermal crosslinking initiator,
   F) at least one reactive diluent curable by at least one of with actinic radiation and thermally,
   G) at least one coatings additive, and
   H) at least one organic solvent,
   wherein the at least one binder contains in copolymerized form at least one olefinically unsaturated polysiloxane macromonomer containing on average per molecule at least 3 double bonds.

2. The coating material of claim 1, wherein the polysiloxane macromonomer contains on average per molecule at least 4 double bonds.

3. The coating material of claim 1, wherein the polysiloxane macromonomer contains on average per molecule up to 10.5 double bonds.

4. The coating material of claim 1, wherein the polysiloxane macromonomer contains on average per molecule from 5.5 to 6.5 double bonds.

5. The coating material of claim 1, wherein the polysiloxane macromonomer has a number-average molecular weight Mn of from 500 to 100,000 daltons.

6. The coating material of claim 1, wherein the polysiloxane macromonomer is in three-dimensionally crosslinked form.

7. The coating material of claim 1, wherein the polysiloxane macromonomer is at least one of an alkylsiloxane resin, cycloalkylsiloxane resin, alkyl-arylsiloxane resin, alkyl-cycloalkyl-siloxane resin, cycloalkyl-aryl-siloxane resin, and arylsiloxane resin.

8. The coating material of claim 7, wherein the alkyl radicals contain from 1 to 10 carbon atoms, the cycloalkyl radicals contain from 3 to 10 carbon atoms, and the aryl radicals contain from 6 to 12 carbon atoms.

9. The coating material of claim 7, wherein the binder comprises an alkylsiloxane resin.

10. The coating material of claim 1, wherein the polysiloxane macromonomer contains, as groups having olefinically unsaturated double bonds, at least one of acrylic groups, methacrylic groups, ethacrylic groups, vinyl groups, allyl groups, and crotonyl groups.

11. The coating material of claim 1, wherein the polysiloxane macromonomer is present in at least one of the binders in copolymerized form in an amount up to 15% by weight of the binder.

12. The coating material of claim 1, wherein the polysiloxane macromonomer is present in at least one of the binders in copolymerized form in an amount of at least 0.01% by weight of the binder.

13. A multicoat clearcoat system for a primed or unprimed substrate, produced by a process comprising
   (1) applying at least one clearcoat film I of a coating material I curable thermally, and optionally with actinic radiation, to the surface of the substrate and at least partly curing it, and
   (2) applying a further clearcoat film II of a coating material II curable thermally, and optionally with actinic radiation, to the surface of the at least one clearcoat film I, and
   (3) curing by one of
      (3.1) the at least one clearcoat film I and the clearcoat film II together if the at least one clearcoat film I was not previously fully cured, or
      (3.2) the clearcoat film II alone if the at least one clearcoat film I was previously fully cured,
   wherein the curing is thermal and, optionally, with actinic radiation wherein at least one of the coating material I and the coating material II is a coating material of claim 1.

14. The multicoat clearcoat system of claim 13, wherein the multicoat clearcoat system is one of an automotive original equipment manufacturing (OEM) finish, an automotive refinish, an industrial coating, a coil coating a container coating, plastic coating, and a furniture coating.

15. A process for producing a multicoat clearcoat system on a primed or unprimed substrate by
   (1) applying at least one clearcoat film I of a coating material I curable thermally, and optionally with actinic radiation, to the surface of the substrate and at least partly curing it, and
   (2) applying a further clearcoat film II of a coating material II curable thermally, and optionally with actinic radiation, to the surface of the at least one clearcoat film I, and
   (3) curing by one of
      (3.1) the at least one clearcoat film I and the clearcoat film II together if the at least one clearcoat film I was not previously fully cured, or
      (3.2) the clearcoat film II alone if the at least one clearcoat film I was previously fully cured,
      wherein the curing is thermal and, optionally, with actinic radiation wherein at least one of the coating material I and the coating material II is a coating material of claim 1.

16. The substrate produced by the method of claim 15.

17. A multicoat paint system for a primed or unprimed substrate, wherein the multicoat paint system is one of a color paint system, an effect paint system, and a color and effect paint system, produced by a process comprising
   (1) applying at least one basecoat film III of a pigmented coating material III curable thermally, and optionally with actinic radiation, to the surface of the substrate, and drying it without curing, wherein the basecoat film is one of a color basecoat, an effect basecoat, and a color and effect basecoat,
   (2) applying at least one clearcoat film I of a coating material I curable thermally, and optionally with actinic radiation, to the surface of the basecoat film III, and one of
      (2.1) partly curing the at least one clearcoat film I alone,
      (2.2) partly curing the at least one clearcoat film I together with the basecoat film III, or
      (2.3) fully curing the at least one clearcoat film I together with the basecoat film III,
      wherein the curing is thermal and, optionally, with actinic radiation,
   (3) applying a further clearcoat film II of a coating material III curable thermally, and optionally with actinic radiation, to the surface of the at least one clearcoat film I, and
   (4) curing by one of
      (4.1) the at least one clearcoat film I, the clearcoat film II, and the basecoat film III together if the at least one clearcoat film I and the basecoat film III were not previously fully cured, or
      (4.2) the clearcoat film II alone if the at least one clearcoat film I and the basecoat film III were previously fully cured,
      wherein the curing is thermal and, optionally, with actinic radiation, wherein at least one of the coating material I and the coating material II is a coating material of claim 1.

18. The multicoat paint system of claim 17, wherein the multicoat paint system is one of an automotive OEM finish, an automotive refinish, an industrial coating, a coil coating a container coating, plastic coating, and a furniture coating.

19. A process for producing a multicoat paint system on a primed or unprimed substrate, wherein the multicoat paint system is one of a color paint system, an effect paint system, and a color and effect paint system, comprising
   (1) applying at least one basecoat film III of a pigmented coating material III curable thermally, and optionally with actinic radiation, to the surface of the substrate, and drying it without curing, wherein the basecoat film is one of a color basecoat, an effect basecoat, and a color and effect basecoat,
   (2) applying at least one clearcoat film I of a coating material I curable thermally, and optionally with actinic radiation, to the surface of the basecoat film III, and one of
      (2.1) partly curing the at least one clearcoat film I alone,
      (2.2) partly curing the at least one clearcoat film I together with the basecoat film III, or
      (2.3) fully curing the at least one clearcoat film I together with the basecoat film III,
      wherein the curing is thermal and, optionally, with actinic radiation,
   (3) applying a further clearcoat film II of a coating material II curable thermally, and optionally with actinic radiation, to the surface of the at least one clearcoat film I, and
   (4) curing by one of
      (4.1) the at least one clearcoat film I, the clearcoat film II, and the basecoat film III together if the at least one clearcoat film I and the basecoat film III were not previously fully cured, or
      (4.2) the clearcoat film II alone if the at least one clearcoat film I and the basecoat film III were previously fully cured,
      wherein the curing is thermal and, optionally, with actinic radiation, wherein at least one of the coating material I and the coating material II is a coating material of claim 1.

20. The substrate produced by the method of claim 19.

* * * * *